(12) United States Patent
Connell (10) Patent No.: US 8,439,387 B1
(45) Date of Patent: May 14, 2013

(54) ADAPTOR FOR ATTACHING FIFTH WHEEL HITCH

(76) Inventor: Colin Connell, Lapeer, MI (US)

( * ) Notice: Subject to any disclaimer, the term of this patent is extended or adjusted under 35 U.S.C. 154(b) by 0 days.

(21) Appl. No.: 13/232,274

(22) Filed: Sep. 14, 2011

Related U.S. Application Data (60) Provisional application No. 61/383,090, filed on Sep. 15, 2010.

(51) Int. Cl.
*B62D 53/08* (2006.01)

(52) U.S. Cl.
USPC ...................................................... 280/438.1

(58) Field of Classification Search .............. 280/433, 280/434, 438.1, 441, 425.2
See application file for complete search history.

(56) References Cited

U.S. PATENT DOCUMENTS

| | | | |
|---|---|---|---|
| 3,876,674 A | 4/1975 | Jenkins | |
| 4,643,443 A | 2/1987 | Husa | |
| 4,960,288 A | 10/1990 | Chambers | |
| 5,513,869 A | 5/1996 | Putnam | |
| D395,025 S * | 6/1998 | Lindenman et al. | D12/161 |
| 6,158,761 A | 12/2000 | King | |
| 6,386,570 B2 * | 5/2002 | Linger et al. | 280/441 |
| 6,557,883 B2 | 5/2003 | Linger et al. | |
| 6,685,210 B2 * | 2/2004 | Lindenman et al. | 280/441 |
| 6,851,695 B2 | 2/2005 | Lindenman et al. | |
| 7,121,573 B2 * | 10/2006 | Lindenman et al. | 280/433 |
| 7,234,905 B2 * | 6/2007 | Warnock | 410/80 |
| 7,673,895 B1 * | 3/2010 | Hesse et al. | 280/417.1 |
| 7,793,968 B1 * | 9/2010 | Withers | 280/496 |
| 2003/0184046 A1 | 10/2003 | Bourgault et al. | |
| 2009/0085326 A1 | 4/2009 | Linger et al. | |
| 2009/0295122 A1 * | 12/2009 | Withers et al. | 280/476.1 |
| 2010/0044997 A1 | 2/2010 | Burns et al. | |

* cited by examiner

*Primary Examiner* — Tony Winner
(74) *Attorney, Agent, or Firm* — Young, Basile, Hanion & MacFarlane P.C.

(57) ABSTRACT

An adaptor for securing a fifth wheel hitch to the bed of a towing vehicle is described. The fifth wheel hitch is typically part of a larger assembly having attachment lugs configured to be removably secured to receptacles in mounting rails permanently attached to the bed of the towing vehicle. Newer towing vehicles are provided with recessed sockets in the vehicle bed, rather than permanently mounted rails, to eliminate obstructions to placement of cargo in the bed. The present invention is, therefore, an adaptor for securing existing fifth wheel assemblies to these newer towing vehicles.

3 Claims, 6 Drawing Sheets

ADAPTOR FOR ATTACHING FIFTH WHEEL HITCH

CROSS-REFERENCE TO RELATED APPLICATIONS

This application claims the benefit of U.S. Provisional Patent Application Ser. No. 61/383,090, filed on Sep. 15, 2010.

FIELD OF THE INVENTION

The present invention pertains to systems for mounting fifth wheel trailer hitches to towing vehicles, and more particularly, to systems for adapting older style fifth wheel assemblies to newer style vehicles.

BACKGROUND

It is common practice to tow trailers, recreational vehicles and the like behind and utilizing automobiles and trucks. For relatively small and lightweight towed vehicles or trailers, conventional Class 1, Class 2 and Class 3 ball-type hitches are commonly mounted to vehicle bumpers and frames. However, as the size and weight of the trailer increases, it is essential that the loads imposed on the vehicle by the trailer be adequately secured and distributed.

Typical of the problem presented is the towing of a large and heavy trailer behind a conventional pickup truck. In these applications, in place of a ball hitch, it is known to use a "fifth wheel" trailer hitch assembly, similar, in many respects, to the fifth wheel hitch coupling used by large highway cargo-hauling tractor/trailers. By using a fifth wheel type trailer hitch mounted directly over or ahead of the rear axle of a pickup truck, such a vehicle can adequately accommodate large and heavy trailers.

It is well known, therefore, to install fifth wheel-type hitches in the beds of pickup trucks, so that the trailer tongue (or "gooseneck") is secured to the towing vehicle bed at the proper longitudinal axes of the vehicle to optimize the placement of the loads imposed by the trailer. Additionally, forward placement of the tongue of the towed trailer in relation to the towing vehicle's wheelbase improves the towing characteristics of the trailer, helping to minimize undesirable sway and oscillation.

Numerous techniques for securing the fifth wheel to the truck bed have been disclosed. See, for example, U.S. Pat. No. 6,158,761, to King and U.S. Pat. No. 6,557,883 to Linger, et al. Typical systems involve the placement of reinforcing mounting rails on the upper surface of the pickup truck bed, and providing such mounting rails with receptacles which will engage corresponding lugs on the fifth wheel assembly. This configuration is desirable so that the fifth wheel assembly can be readily removed from the towing vehicle, to open the cargo area of the towing vehicle for load carrying and tasks. Numerous similar methodologies have been used in the past, all designed to achieve the same goals, i.e., removability so that the vehicle can be used as a cargo-carrying vehicle, and sturdiness, so that when used as a towing vehicle, the appropriate support is provided by the towing vehicle's bed and mounting rails.

While these prior art systems have worked adequately, it has long been recognized that the presence of permanently mounted support rails in the bed of the pickup truck is still undesirable, in that these mounting rails present some obstacle to the loading and unloading of the bed of the vehicle. Recognizing this limitation, at least one motor vehicle manufacturer has designed and incorporated into its pickup truck a recessed mounting system. Such a system is disclosed in U.S. Pat. No. 7,121,573 to Lindeman, et al. This system moves the supports for the fifth wheel assembly to the underside of the truck bed, and provides the supports with recessed receptacles or sockets which are substantially flush with the truck bed upper surface. In this fashion, the truck bed remains relatively unobstructed when the fifth wheel assembly is not installed.

Fifth wheel trailer hitch assemblies are, not unexpectedly, expensive because of their mechanical complexity as well as the requirement that they be extremely sturdy. The newer fifth wheel mounting scheme taught by Linderman suffers from the requirement that a specialized fifth wheel hitch assembly be utilized, so that the fifth wheel assembly-mounting scheme is complimentary with the array of mounting sockets installed in the truck bed. For obvious reasons, owners of older fifth wheel assemblies would prefer not to have to incur the expense of buying an entire new assembly, and discarding an older style.

A need exists, therefore, for adapting older style fifth wheel trailer hitches to newer style truck bed mounting arrays. The present invention addresses this need.

SUMMARY

The invention is an adaptor which will interface with a conventional fifth wheel trailer hitch assembly and a modern pickup truck hitch-mounting configuration. The invention comprises a base plate and framework. Mounted to the base plate are a plurality of locking key inserts which engage the recessed receptacles in a pickup truck bed. The assembly is further provided with a set of mounting receptacles which are designed to engage the mounting lugs of an older style fifth wheel hitch assembly. The invention is further provided with quick release means by which the mounting lugs of the invention may be reliably yet removably secured to the truck bed.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 6:
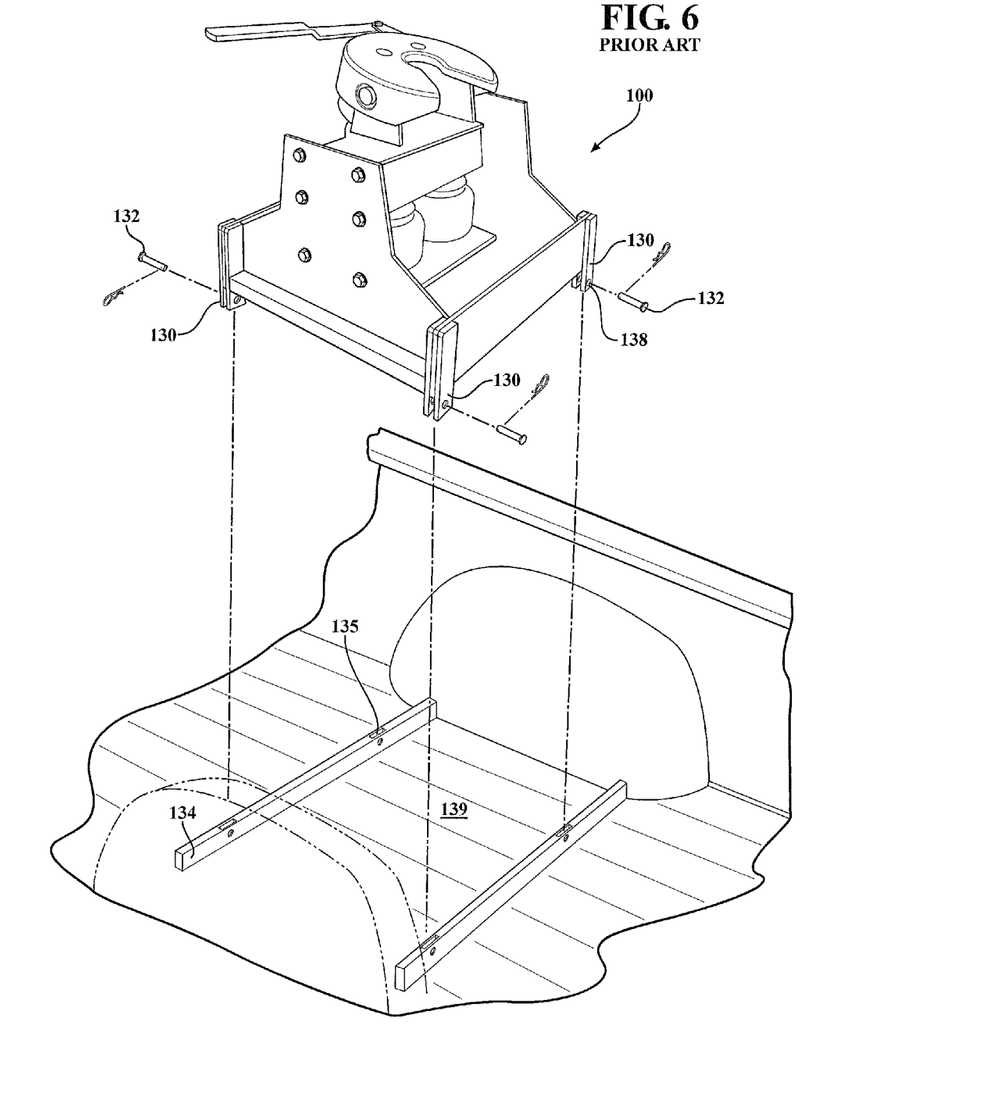
FIG. 6 is a perspective view of a prior art mounting system, showing typical mounting rails in a truck bed and a typical fifth wheel assembly.

A preferred embodiment of the invention will be best understood by reference to FIGS. 1-6 attached hereto, and the corresponding numerals as herein explained. A conventional fifth wheel assembly 100 comprises a fifth wheel 110 having an arcuate plate 112 and an entry 114. The upper surface of the arcuate plate 112 forms a bearing surface 116. Adjacent to the entry 114 is a latch 118 which may be rotated by operating lever 120. In this fashion, a pin projection (not shown) from a trailer tongue (not shown) is inserted into the entry 114 and latched into position by latch 118 utilizing operating lever 120. This results in the complimentary bearing of a portion of the trailer tongue (not shown) on arcuate plate 112. The fifth wheel 110 is provided with a support further comprising a mounting frame 124 integral with side plates 126, and secured to end plates 128. Mounting lugs 130 for mounting the entire assembly are provided with releasable fasteners 132. In a typical prior art installation as shown in FIG. 6, mounting rails 134 are provided with rectangular receptacles 135 into which mounting lugs 130 of fifth wheel assembly 100 slidably fit. This description of the prior art is not exhaustive, and there are a number of different configurations by which the mounting lugs 130 may engage mounting rails 134. In most known prior art configurations, however, mounting rails 134 remain permanently affixed to the truck bed 139 of the towing vehicle.

Newer towing vehicles, as depicted in U.S. Pat. No. 7,121,573, are provided with support members 140 mounted below the truck bed, and receptacles 142 pass through the truck bed into the support members. The fifth wheel assembly itself is provided with support legs, on the distal ends of which are inserts which are designed to engage the receptacles 142 above described.

The present invention is designed to permit an older style fifth wheel assembly 100 having mounting lugs 130 to be safely and securely mounted to the truck bed 139 mounting of the type described in the '573 patent. To achieve this result, an adaptor assembly 10 is constructed from an essentially rectangular base plate 12, typically of a high strength material such as steel. To reduce the overall weight of the invention, one or more lightening holes 14 may be provided in the base plate 12. Passing through holes in the base plate are a plurality of rotatable feet 16, spaced at distances corresponding to the configuration, array and distances of the receptacles 142 of the type disclosed in the '573 patent. Base plate 12 is provided with reinforcing rails 18 and mounting rails 20. Rectangular receptacles 22 are provided in mounting rails 20. Mounting rails 20 are also provided with openings 28 into which may be placed releasable fasteners 132. The mounting lugs 130 of a typical fifth wheel trailer hitch assembly are provided with openings 138. As will be appreciated from examination of FIGS. 1-6, placement of the rectangular mounting lugs 130 of the fifth wheel assembly 100 into the rectangular receptacles 22 of mounting rails 20 positions openings 138 in alignment with corresponding openings 28 in the mounting rails 20, whereby releasable fasteners 132 may be inserted through the mounting rails 20 and the mounting lugs 130 to secure the fifth wheel assembly 100 at the mounting rails. Releasable fasteners 132 may be threaded-type fasteners, or quick release fasteners of a variety of well-known types, to simplify attachment of the fifth wheel assembly 100 to the invention.

The invention is provided with handgrips 26 to facilitate movement and positioning of the invention in relation to the truck bed 139 in which the invention will be placed.

Figure 4:
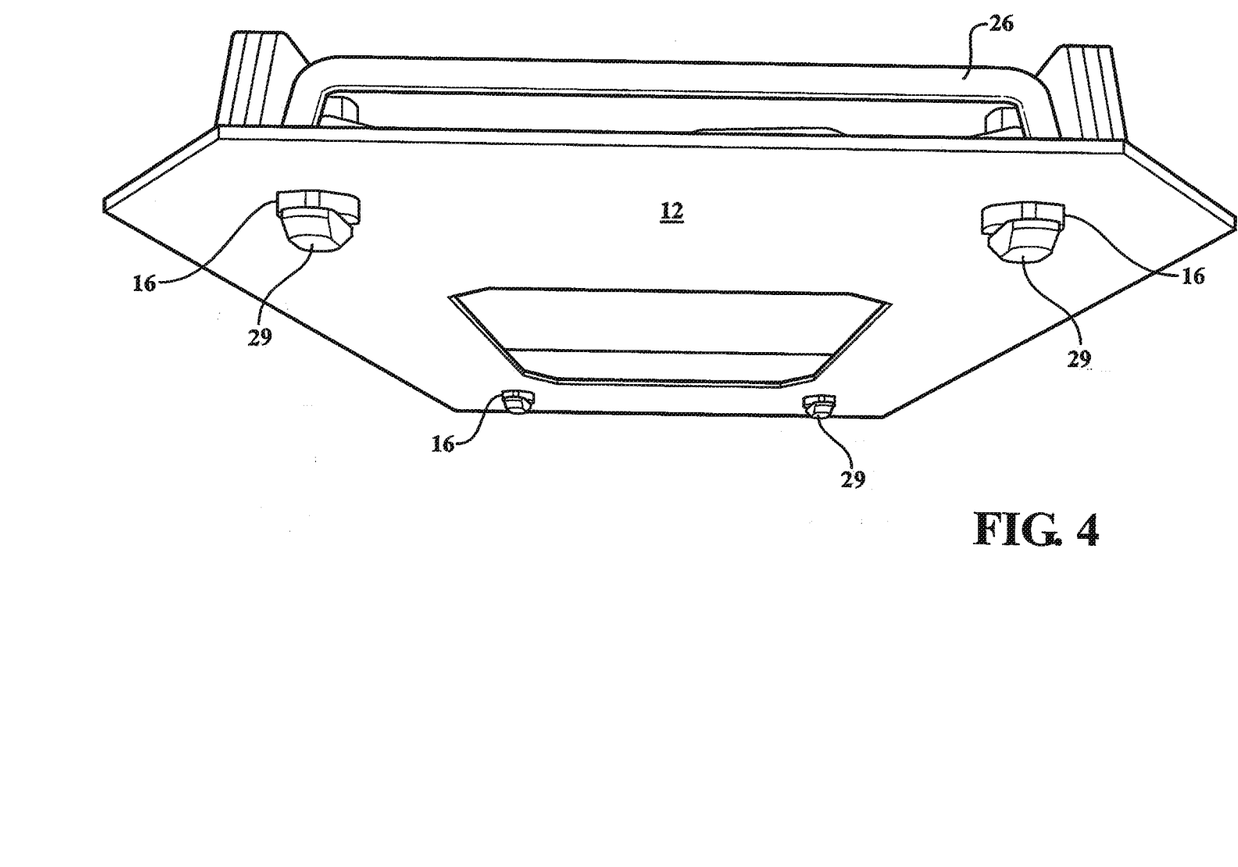
FIG. 4 is a perspective bottom view of the invention depicting details of the mounting mechanism.
Figure 5:
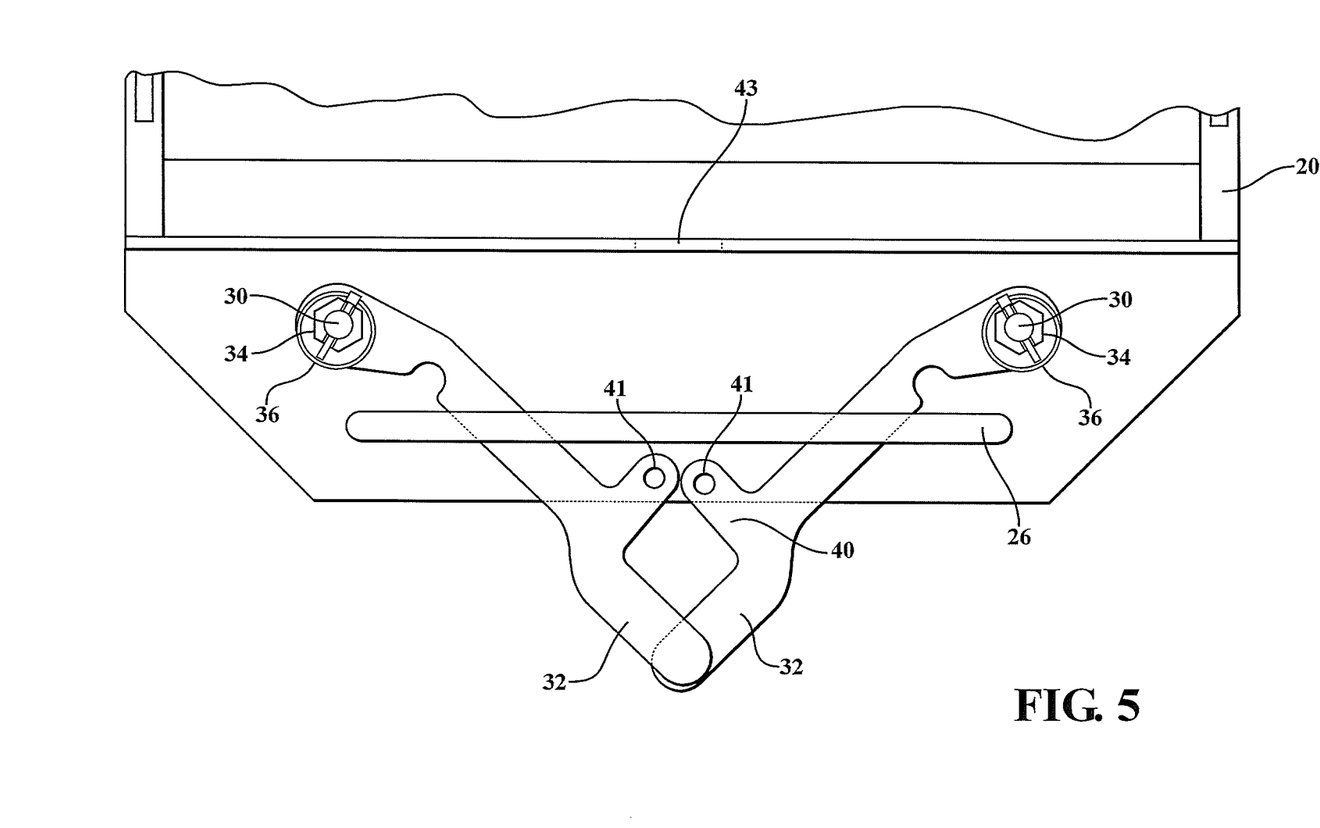
FIG. 5 is a close-up view of the mechanism for locking the invention in place in a pickup truck bed.

It will be appreciated from further examination of FIG. 4 that the rotatable feet 16 are provided with keyed ends 29. The keyed ends 29 are unitary with the shafts 30, which are in turn secured to locking handles 32 utilizing nut ends 34. A through bore is provided in each shaft 30 to accept a locking pin 36. In this fashion, rotation of locking handles 32 insures rotation of shaft 30 and rotatable of keyed ends 29 of the rotatable feet 16.

Figure 1:
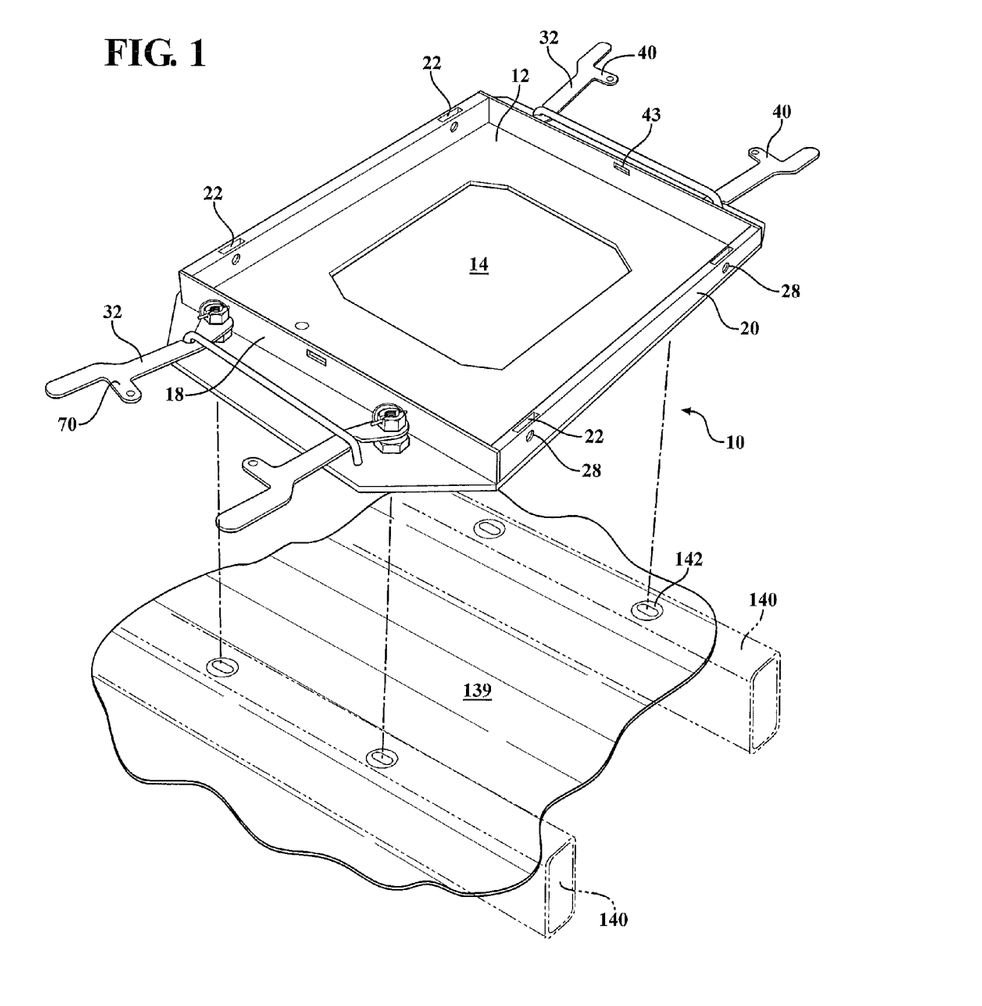
FIG. 1 is a perspective view of the present invention.
Figure 2:
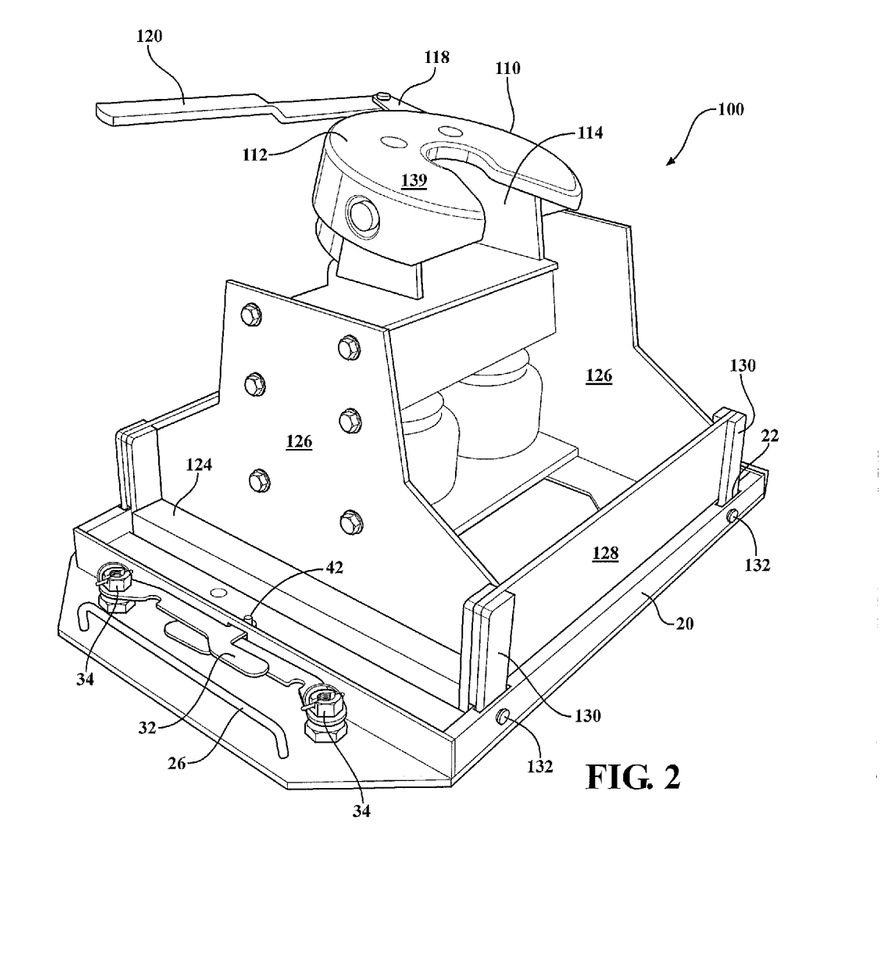
FIG. 2 is a perspective view of the invention with a fifth wheel assembly mounted thereto.
Figure 3:
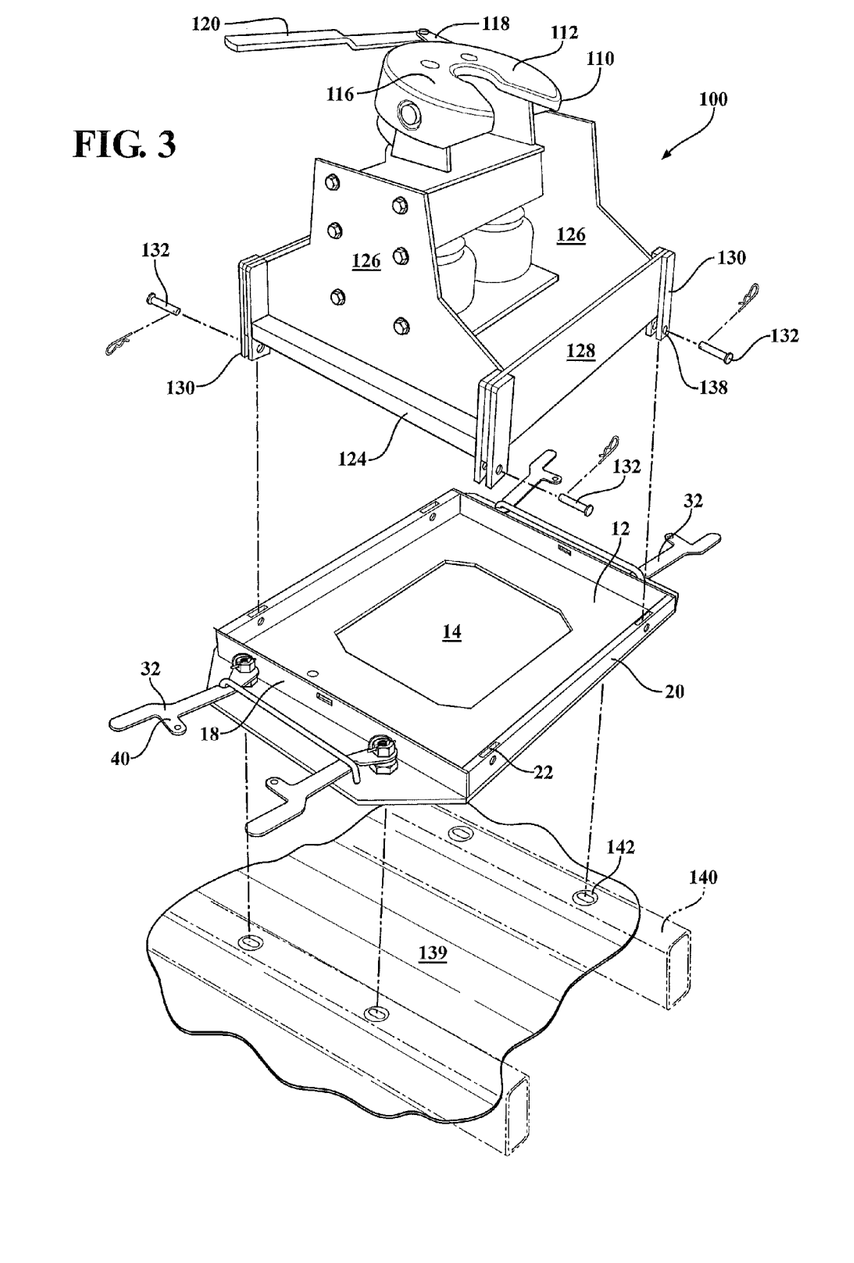
FIG. 3 is an exploded perspective view of the invention as installable in the bed of a typical pickup truck, and showing a typical fifth wheel assembly in mounting alignment thereto.

The receptacles 142 of the type disclosed in the '573 patent are likewise keyed having an elongated configuration, so that insertion of the keyed ends 29 of the rotatable feet 16 into the truck bed receptacles 142 is facilitated only when the locking handles are rotated outwardly in the position depicted in FIG. 3. Thereafter, rotation of the locking handles 90° results in an interference between the keyed ends 29 and the elongated configuration of the receptacles 142, preventing removal of the adaptor assembly 10 from the pickup truck bed. The locking handles are further provided with locking handle extensions 40 in which are provided locking holes 41. When rotated to their locked position, the locking holes 41 of the two locking handles 32 are superimposed, and the locking handle extensions 40 are inserted into a locking slot 43 on the side reinforcing rails 20. As the locking holes 41 of the two locking handle extensions 40 are superimposed and pass through the reinforcing rails 18, a pin 42 is placed in the locking holes 41, thereby restricting the locking handles 32 from rotation, and completing the process of locking the invention in place on the pickup truck bed.

Once the adaptor assembly 10 is secured in position, it will be readily understood that a conventional fifth wheel assembly 100 having mounting lugs 130 may be placed into the rectangular receptacles 22 of the mounting rails 20, and secured in position with removable fasteners 132. It will be likewise appreciated that when the fifth wheel assembly 100 is not in use, that it may be readily removed from the adaptor assembly 10 by removal of the removable fasteners 132 from the mounting rails 20. Likewise, removal of pin 42 from the holes 41 in the locking handle extension 40 allows the locking handles 32 to be rotated thereby aligning the keyed ends 29 of the feet 16 with the receptacles 142 of the pickup truck bed, thereby allowing removal of the entire adaptor assembly 10 and leaving the pickup truck bed unimpeded by mounting rails.

It will also be appreciated that the fifth wheel assembly 100 can remain attached to the adaptor assembly 10 by keeping the removable fasteners 132 engaged with the mounting rails 20 of the adaptor assembly 10 and the mounting lugs 130 of the fifth wheel assembly. In this fashion, the combination of the fifth wheel assembly 100 and adaptor assembly 10 can be handled, installed, removed and stored as a unit, if desired.

The invention, accordingly, allows use of existing fifth wheel assemblies as designed for mounting in a first configuration on a towing vehicle, to be adapted for mounting on a towing vehicle having a second configuration for fifth wheel mounting. The above embodiment is but one example of an adaptor as contemplated by the present invention.

Having thus described my invention, numerous obvious modifications and improvements thereto may be made by the skill of the artisan, without departing from the substance of my invention, which I claim as follows:

The invention claimed is:

1. An assembly for securing a fifth wheel trailer hitch to a towing vehicle:
   a first mechanism including flush mounted receptacles that are fixedly connected to said towing vehicle;
   a second mechanism provided on said fifth wheel trailer hitch for securing said hitch to said vehicle, said second mechanism including a plurality of mounting lugs each defined by an upstanding plate-like member having a horizontally-oriented mounting lug opening extending therethrough, and said second mechanism being incompatible with said first mechanism; and
   an adaptor that includes a substantially rectangular frame, a first engaging mechanism for connecting said substantially rectangular frame to said first mechanism, and a second engaging mechanism for connecting said substantially rectangular frame to said second mechanism, wherein said first en a in mechanism includes inserts that are rotatably connected to said frame and are receivable within said flush mounted receptacles of said first mechanism and are rotatable to a locked position to secure said adaptor with respect to said towing vehicle, and wherein said second engaging mechanism includes a plurality of upstanding plate-like mounting rails having horizontally oriented mounting rail openings that are configured to be aligned with said mounting lug openings of said second mechanism and fasteners that extend through said mounting rail openings and said mounting lug openings to secure said hitch with respect to said adaptor.

2. An adaptor for securing a fifth wheel trailer hitch having a plurality of mounting lugs arranged in a first pattern to a bed of a towing vehicle, said towing vehicle equipped with a plurality of substantially flush-mounted sockets arranged in a second pattern in said bed, said adaptor comprising:

a frame that is removably connectable to said fifth wheel trailer hitch and is removably connectable to said towing vehicle such that said frame is disposed on and in engagement with said bed of said vehicle, said frame comprising a plurality of receptacles arranged according to said first pattern for receiving said mounting lugs of said fifth wheel trailer hitch to removably connect said fifth wheel trailer hitch to said frame, and said frame further comprising a plurality of inserts arranged according to said second pattern, wherein said inserts engage said sockets when said frame is disposed in engagement with said bed to removably connect said frame to said towing vehicle.

3. An adaptor for interconnecting a trailer hitch assembly and a bed of a pickup truck, said bed comprising a plurality of receptacles for engaging said adaptor, the improvement comprising:

a frame comprising at least two spaced-apart longitudinal members and at least two spaced-apart transverse members that define a substantially rectangular configuration for said frame, said transverse members each incorporating a plurality of slots, and said trailer hitch assembly comprising a plurality of projections configured to be inserted into and engage with said slots;

a plurality fasteners that are removably engagable with said trailer hitch assembly and said frame to retain said projections of said trailer hitch assembly within said slots of said frame;

a plurality of inserts that are rotatably connected to said longitudinal members of said frame and are receivable within said receptacles and are rotatable to a locked position with respect to said receptacles to secure said frame in engagement with said bed of said pickup truck; and a plurality of handles each connected to a respective one of said plurality of inserts, each handle having an extension that extends through a handle extension opening of a respective one of said longitudinal members of said frame with the inserts are in said locked position, and each handle extension having an opening for receiving a pin to engage a respective one of said longitudinal members and restrain movement of said handles with respect to said frame to prevent said inserts from moving from said locked position toward an unlocked position.

* * * * *

UNITED STATES PATENT AND TRADEMARK OFFICE
CERTIFICATE OF CORRECTION

PATENT NO. : 8,439,387 B1
APPLICATION NO. : 13/232274
DATED : May 14, 2013
INVENTOR(S) : Colin Connell It is certified that error appears in the above-identified patent and that said Letters Patent is hereby corrected as shown below:

In the Specifications

Column 4, line 66, delete "en a in" and insert --engaging--.

Signed and Sealed this
Thirteenth Day of August, 2013

Teresa Stanek Rea
*Acting Director of the United States Patent and Trademark Office*